US010235509B2

(12) United States Patent
Goldstein

(10) Patent No.: US 10,235,509 B2
(45) Date of Patent: Mar. 19, 2019

(54) METHODS AND SYSTEMS FOR A VOICE ID VERIFICATION DATABASE AND SERVICE IN SOCIAL NETWORKING AND COMMERCIAL BUSINESS TRANSACTIONS

(71) Applicant: Staton Techiya, LLC, Delray Beach, FL (US)

(72) Inventor: Steven W. Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

(21) Appl. No.: 14/466,943

(22) Filed: Aug. 22, 2014

(65) Prior Publication Data

US 2015/0058016 A1 Feb. 26, 2015

Related U.S. Application Data

(60) Provisional application No. 61/868,792, filed on Aug. 22, 2013.

(51) Int. Cl.
*G06F 21/32* (2013.01)
*H04W 4/21* (2018.01)
*G06F 17/30* (2006.01)
*H04L 29/06* (2006.01)
*G10L 17/04* (2013.01)

(52) U.S. Cl.
CPC ........ *G06F 21/32* (2013.01); *G06F 17/30743* (2013.01); *G06F 17/30764* (2013.01); *H04L 63/0861* (2013.01); *H04W 4/21* (2018.02); *G10L 17/04* (2013.01)

(58) Field of Classification Search
CPC ................ G06F 21/32; H04W 4/21
See application file for complete search history.

(56) References Cited

U.S. PATENT DOCUMENTS

| 6,084,967 | A | 7/2000 | Kennedy et al. |
| 7,158,776 | B1 | 1/2007 | Estes et al. |
| 7,536,304 | B2 | 5/2009 | Di Mambro et al. |
| 7,716,055 | B1 | 5/2010 | McIntosh et al. |
| 7,877,254 | B2 | 1/2011 | Luan et al. |
| 8,280,740 | B2 | 10/2012 | Di Mambro et al. |
| 8,358,759 | B2 * | 1/2013 | Kumar ............ H04M 3/42042 340/5.82 |
| 8,571,867 | B2 | 10/2013 | Di Mambro et al. |
| 8,583,750 | B1 | 11/2013 | Hewinson |
| 2009/0319270 | A1 * | 12/2009 | Gross ............. G10L 15/22 704/246 |

(Continued)

*Primary Examiner* — Ibrahim Siddo
(74) *Attorney, Agent, or Firm* — Akerman LLP; Peter A. Chiabotti; Mammen (Roy) P. Zachariah, Jr.

(57) ABSTRACT

A method and system for voice identification and validation is provided. Other embodiments are disclosed. The system registers one or more users on a social media platform with login information during a social media session, acquires a voice sample at any time of the social media session or a continuation of the social media session, associates the login information and the voice sample in a profile for each of the one or more users, stores the profile as a voice print in a voice print identifier database, and identifies at least one talker from an interfacing of the social media platform with the voice print identifier database. Other embodiments are provided.

20 Claims, 3 Drawing Sheets

Voice ID Network Systems

(56) References Cited

U.S. PATENT DOCUMENTS

2013/0018657 A1    1/2013  Di Mambro et al.
2013/0097682 A1*   4/2013  Zeljkovic .............. H04L 9/3231
                                                        726/7

* cited by examiner

Voice ID Network Systems

METHODS AND SYSTEMS FOR A VOICE ID VERIFICATION DATABASE AND SERVICE IN SOCIAL NETWORKING AND COMMERCIAL BUSINESS TRANSACTIONS

CROSS-REFERENCE TO RELATED APPLICATIONS

This application claims the benefit of U.S. provisional patent application No. 61/868,792 filed on 22 Aug. 2013, the disclosure of which is incorporated herein by reference in its entirety.

FIELD

The present embodiments herein disclosed generally refer to methods and systems for voice identification and verification in conjunction with social networking and social media.

BACKGROUND

The term voice recognition or speaker identification refers to finding the identity of "who" is speaking, rather than identifying the content of what they are saying. Recognizing the speaker can simplify tasks of translating speech in systems that have been trained on a specific person's voice or it can be used to authenticate or verify the identity of a speaker as part of a security process.

Speech signals include information about the creator of the speech; that is, the person talking. Modern technology known as Speaker ID or Voice Verification can identify the speaker as one of a moderate collection of speakers, or can verify a claimed identity, in a short segment of speech or a collection of such segments. The requirement for such an identification process is that the speech of the person to be identified is available independently of the message.

Biometrics refers to metrics related to human characteristics and traits. Biometric identification (or biometric authentication) is used in computer science as a form of identification and access control based on human characteristics and traits. It is also used to identify individuals in groups that may be monitored or under surveillance. Biometric identifiers are the distinctive, measurable characteristics used to label and describe individuals. Biometric identifiers are often categorized as physiological versus behavioral characteristics.

Whether at business related events (e.g. trade shows, meetings, conferences) or social gatherings (e.g. wedding receptions, party celebrations), situations often arise where people meet for the first time or cannot remember the names of participants they have met before or would like to have more background information of their conversation partners. A need for voice identification in such situations exists, including private use cases, commercial business transactions and government use cases.

DETAILED DESCRIPTION

Figure 1:
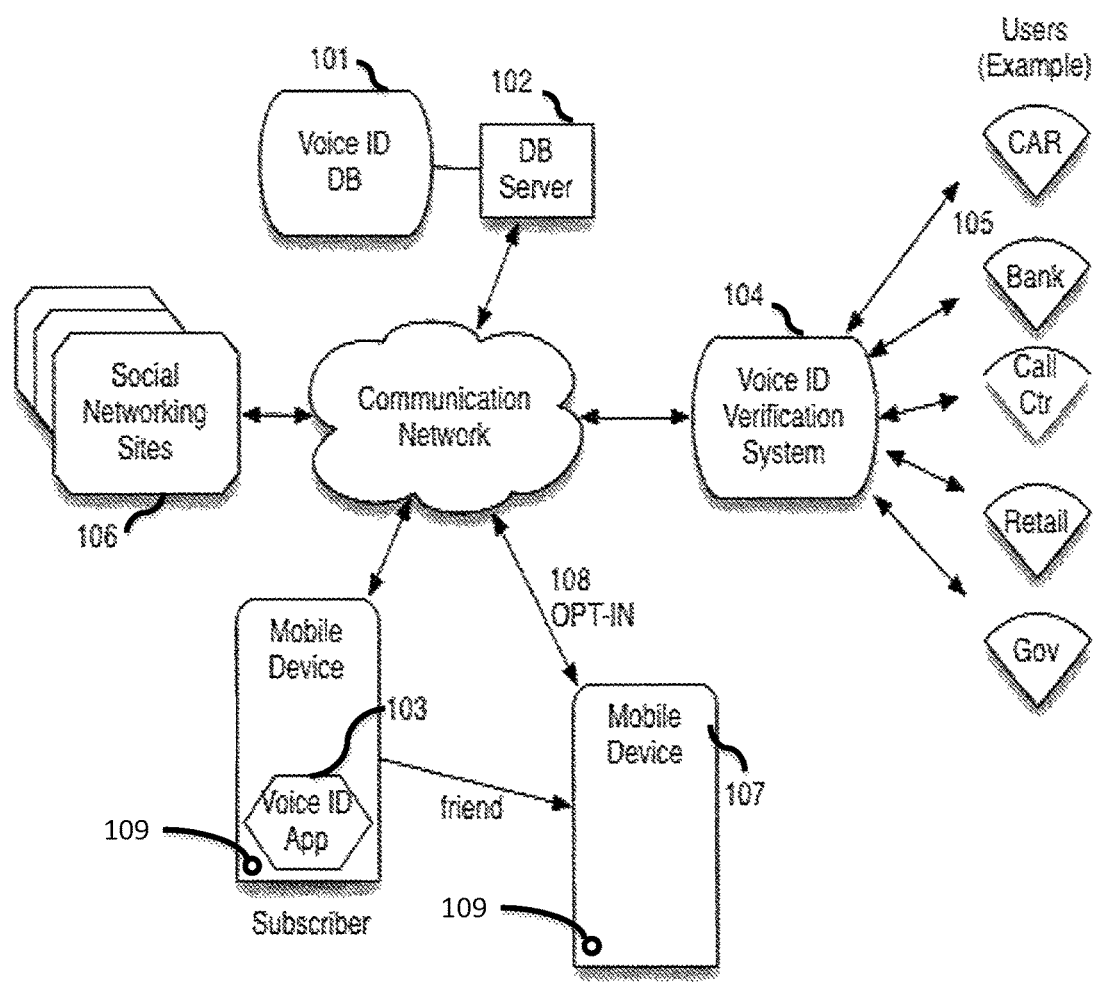
FIG. 1 depicts Voice-ID network functions in accordance with an exemplary embodiment.

The following descriptions of exemplary embodiments are merely illustrative in nature and are in no way intended to limit the embodiments herein, its application, or uses.

Processes, techniques, apparatus, and materials as known by one of ordinary skill in the relevant art may not be discussed in detail but are intended to be part of the enabling description where appropriate, for example the fabrication and use of transducers.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Some of the embodiments herein disclosed generally refer to methods and systems for voice identification (ID) and verification in conjunction with social networking and social media for private use cases, commercial business transactions and government use cases.

FIG. 1 illustrates a realization of the Voice-ID network system 100 according to an embodiment of the present embodiments. As shown in FIG. 1, the components of the Voice-ID network include:

a voice identifier database 101 that contains the Voice IDs of opted in Voice-ID network subscribers, a database server 102 that controls the opt-in procedure, a voice ID App 103 that is installed on a mobile device delivers visual profile information about people in the vicinity of the device and controls the recording and delivery of voice samples to create voice prints for the OPT-In procedure a social media application (e.g., social networking sites) 106 to communicate with other people that in conjunction with the voice identifier database 101 identities other participants made available via the web or other interconnection means, An ID Verification Service System 104 that provides an interface to a multitude of users in need of ID verification 105

At least one mobile device 107 having a microphone 109 and providing an established social media connection (e.g., friend) to the voice ID App 103

The Voice IDs stored in the voice identifier database 101 are also referred to as voice prints or voiceprints. The voiceprint is an efficient distillation of the speech of a talker which contains information about his or her identity, but which does not necessarily contain information about the content of the speech used to make the voiceprint. The voice prints include 1) a voice sample, for example, a spoken utterance, or phrases, digitally captured and stored on media, 2) a profile associated with the voice sample (described below), and optionally 3) device specific information, for example, a global positioning system (GPS) location, a Wi-Fi network, a MAC address, an IP address, and a unique device identifier, such as provided by the mobile device running the voice ID App 103.

The profile can include information such as a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record. The aforementioned list of profile information is not meant to be exhaustive and only provides a sample of the types of information that can be used in the embodiments herein. As discussed later, such profile information can be used to corroborate an identity.

In the modern collection of algorithms for analyzing audio and speech signals, one aspect of the embodiments is a method to identify the talker of any particular utterance, independent of the information contained in the transcription of that utterance. That is, the talker is identified on only the characteristics of that person's voice, and not on the content or phrase of a spoken utterance. Also, in face-to-face interactions with other people the method described herein identifies information about the people whose voice are captured and/or engaging in a spoken interchange (There might be a mix of people, for instance in a conference room which includes people on a speaker phone, or in a conference setting with some people at a remote site). The Voice-ID network system of FIG. 1 obtains in near real-time the ID, profile and personal information of individuals merely by capturing their voice prints. This greatly enhances the ability for people to socialize and interact in a variety of situations.

Another aspect of the embodiments is the building and updating of a large and secure voice identifier database 101 of voice prints through the utilization of social media, and further incorporating the voice prints to enable enhanced social media value and security. Once configured, this database allows for a novel ID verification service based on capturing voice samples that benefits a multitude of users ranging from financial institutions to the control of set top boxes and vehicle access, to name a few. The large scale building up of the voice ID entries and the voice identifier database 101 is further achieved through the exploitation of contact and friends lists that are part of social networking. Voice identification is performed through a profile searching of social media. This efficient searching identifies voice samples of unknown talkers through access of contact or friends lists of a device used to capture the voice samples associated with a user of the device by way of the voice print.

As an example, law enforcement would benefit tremendously from having the ability to verify the identity of a person based on the person's voice sample. For instance, Police interviewing a driver during a routine traffic stop may use the driver's license and registration to direct the network to a stored voiceprint, for which the officer can validate if it is or isn't the driver as shown on their documents. In order to support this capability, a large database of voice prints would be required to make this procedure practical as a standard law enforcement routine. Further, this embodiment may contribute to Homeland Security and ecommerce in providing voice identification and verification services leveraging a large voice print database.

Figure 2:
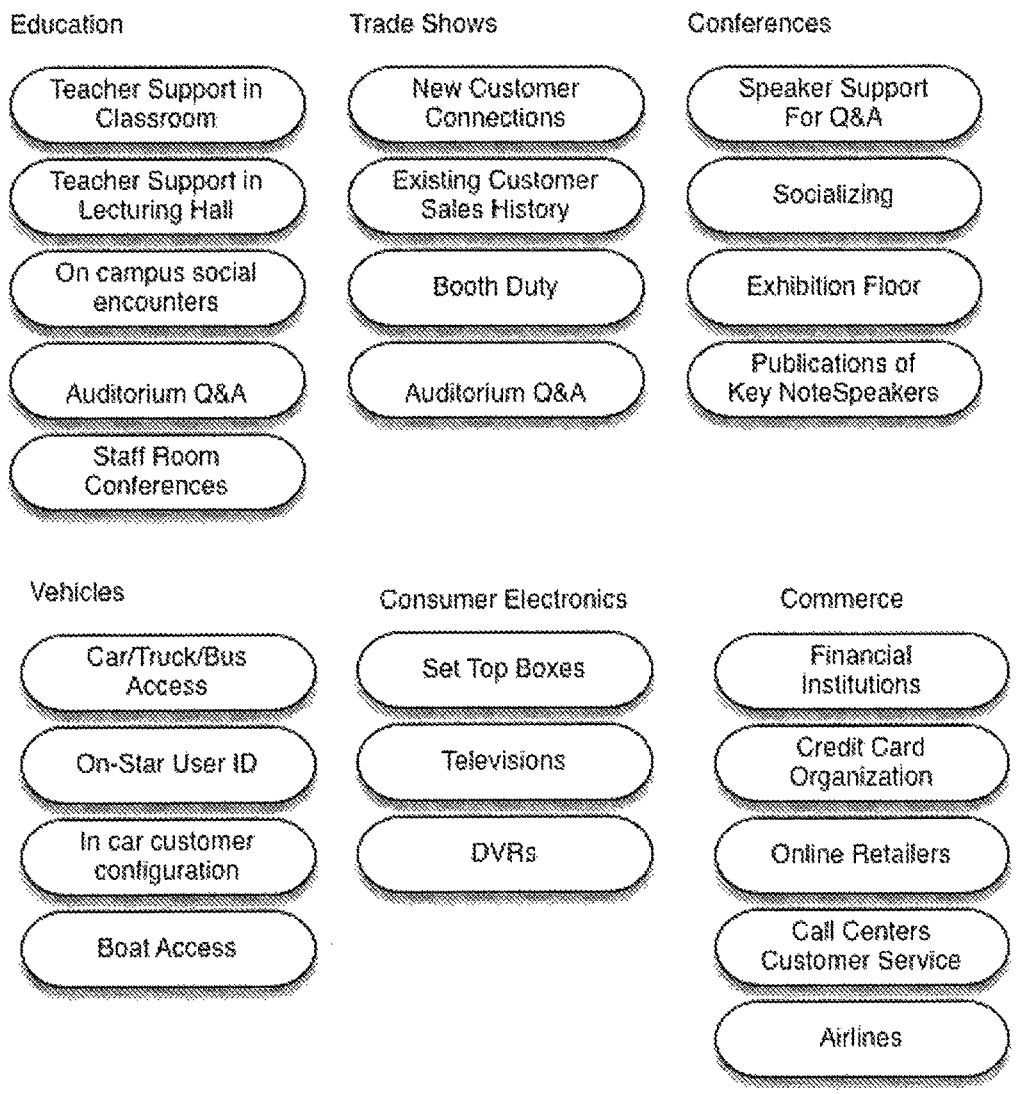
FIG. 2 depicts a set of use case examples in accordance with an exemplary embodiment.

FIG. 2 illustrates examples of potential users and use cases of the Voice-ID Network according to an embodiment herein. As shown in FIG. 2, the example areas of use include but are not limited to:
Education
Trade Shows
Conferences
Commerce
Consumer Electronics
Vehicles In one embodiment, the Voice-ID network system 100 of FIG. 1 performs a method of voice identification and validation. For exemplary purposes, the method can be practiced individually, or in combination, by the voice ID App 103 and/or the database server 102. In a first step, the method registers one or more users on a social media platform with login information during a social media session (also referred to as 'social media'). The social media means a friend list, a contact list, an email account, a text message history, a call history, an internet search history, a conference event, a community organization, a social network, a social networking application, an on-line data repository, a social application, social software or social program, though not limited to these. For example, a user of the mobile device runs the voice ID App 103 while also running a social media session, for example, Facebook, Twitter, Instagram, or other social networking site. The voices ID App 103 can alternatively be integrated within the social media session, for example, as an add-on, plug in or download. The login information the user enters into the social media session can also be captured by the voice ID App 103. Alternatively, if privacy is enabled, the user can also manually enter the login information to the voice ID App 103.

In a following step, a voice sample is acquired at any time of the social media session, or a continuation of the social media session. For example, upon logging into the social media session, the user may be prompted to provide a voice sample, a spoken utterance by the user. The user may do this during the login, or at a later time, whether logged into the social media session or with the voice ID App 103 with or without the same device previously used in the social media session. Although not required, the spoken utterance may include speech specific content for example, a personal phrase, the user may recall and that can be used to further identify the user. The voice sample is digitally stored to the mobile device and/or uploaded to the database server 102.

In a following step, the login information and the voice sample are associated in a profile for each of the one or more users. This association may be performed on the mobile device and/or on the database server 102. Thereafter, the profile is stored as a voice print in a voice print identifier database by the database server 102. In the optional case where device specific information is captured from at least one device used during the social media session to capture the voice sample, the login information, the voice print and the device specific information are associated in the profile for each of the one or more users.

Once the registration is complete and the voice print is created specific to the user, that voice print may be referenced by voice ID opt-in subscribers to identify the user from an interfacing of the social media platform with the voice print identifier database. The interfacing between the social media platform and the voice print identifier means a matching or correlating of profiles or data entries in profiles that include voice samples with information from data points in social media from the social media platform. The data points may be any of the device specific information available to the mobile device on which the social media is running or any data provided with the registering or login to the social media. The interfacing also includes the conduct of the searching in the voice identifier database 101, for example, by the voice APP 103 accessing contact and friends lists to corroborate data between profiles and other devices 107 for prioritizing a list of voice prints in the voice identifier database 101.

The opt-in subscribers are those individuals that have entered into a service for the voice ID App 103 or other affiliation. When a sufficiently large population of voice prints are stored in the database server 102, a multitude of different users that are opted into (subscribed) the voice ID system can then retrieve the voice prints, for example, by way of contact and friends lists to identify one or more talkers. This includes other opt-in users on other mobile devices 107. One novel aspect is that the user by way of the voice ID App 103 can elect for opt-in use of that user's contact list and friend list and other social connectivity data to enhance searching in the voice identifier database and amongst the other mobile devices 107. This allows other opt-in users to narrow a search for a talker's voice print by first using the contact and friends list to check for voice print matches.

A user can thereafter launch the voice ID App 103 on their mobile device to identify other talkers in proximity to the mobile device whose voice samples can be captured from a microphone 109 on the mobile device and who may share common interests. For example, at an organized event, such as a concert, a conference, a venue, an auditorium, or other locale at which people are present for common reasons or shared interests, the user may see someone they recognize but cannot recall their name or information, for instance, where they live, what they do as a profession, activites, etc. Given that both the user and the unidentified talker are in proximity possibly because of common reasons (e.g., school meeting, neighborhood committee, local grocery store, sports event, etc.) there is a likely chance that they share similar information (e.g., kids at same school, neighborhood address, same interests, etc.).

A unique aspect of the method herein described is to narrow a search of the voice print for the voice sample to potential voice print candidates that share similar information, such as that in the profile or the device specific information noted above. The searching can also include searching contact and friends lists on established connections to nearby devices, for instance, the other mobile devices 107. The voice ID App 103 can access a contact or friend list associated with the talker, and narrow down a searching extent for confirming an identity of the talker from the contact or friend list. Furthermore, it can modify an access control to the device (103 or 107) responsive to detecting and verifying a talker, including but not limited to, automatically changing and entering log in credentials, account information, device controls, or personal preferences. For example, a user not using their device but rather using a friend's device can log into their social media account using the friend's phone through the voice ID App 103 that upon recognizing the talkers voice, logs into the social media with the login information from the profile of the recognized talker.

As part of the identification of the at least one talker, the login information from the profile for the user by way of the voice ID App 103 accesses the social media and searches for established connections to the voice print identifier database. In this way, the voice identification is first performed on voice prints that are most probable, through established social media connections, to be a person the user knows. An established connection is one in which two or more people are able to view at least a portion of each other's public information; for example, but not limited to, common connections, social groups, interests, records, websites, postings, etc. They may also have a connection status of associate, acquaintance, friend, etc. This avoids requiring the database server to blindly search all voice prints for matches of an unknown voice sample, and thus scales down the search to a smaller sample space; namely, to those most likely through social connections. Of course, other data parameters in a profile can be used to scale down or narrow down a search.

The searching also includes corroborating the profile with the social media to validate an identity of the at least one talker. The profile may also include the device specific information, for example, if captured with a device having the microphone of which was used to capture the voice sample. The voice ID App 103 retrieves the profiles corresponding to the device from the device specific information, or corresponding to a user of the device from the login information, to narrow a searching extent of the voice print stored in the voice identifier database when accessing the social media. For example, information in the profile, such as a favorite activity like tennis is evaluated against similar social information in the unidentified talker. So, if the user is at a tennis match, the method takes the GPS location information (device specific information), queries social media to corroborate that a tennis tournament is occurring in the area, it then looks up the user's friend or contact list to see if others have social tennis interests, and prioritizes the search of voice prints for those identifies with same social tennis interests.

It may also extend the searching to the other mobile devices 107 in proximity whose user's are opted into the voice ID App 103 service. This is merely one example. In another case a user may register on-line at a particular date for a speaking forum, and when the user attends the forum for the event, and upon initiating a voice capture of an unknown person speaking at the event, the voice ID App 103 checks the users GPS location to corroborate that the user is indeed at the registered event, and then accesses social media to further corroborate that the event is taking place and upon so requests an attendee list from the registration, it then narrows down the searching to prioritize established social media connections determined between the user and registered guests on the list. Similarly, it may also extend its searching to the other devices 107 in proximity whose user's are opted into the voice ID App 103 service to corroborate social connections and individual identification.

The voice ID App 103 then compares the voice sample of the at least one talker with the voice prints of the profiles for the established connections in the voice print identifier database 101 to determine a match to an identified talker. Upon detecting a voice sample match to a voice print, the voice ID App 103 responds with at least a portion of the profile of the identified talker. For instance, in the continuing example, the user at the event upon capturing an unidentified talker's voice in proximity is visually presented with the talker's identify (if a match was found), for instance, their name, profession, and other information, for example, public or permitted data such as address, common interests, and the established connection (e.g., friends on facebook, etc.). Moreover, the Voice-ID network system of FIG. 1 by way of the voice ID App 103 and the other mobile devices 107 can capture multiple voices from multiple talkers within vicinity of a mobile device or over a social network, and present an indication of the identity of some or all of the multiple talkers, including but not limited to, a name, background or contact information of the talkers. This extends to events comprising multi-call, multi-conference, video call, group call, multiple person events, speaking engagements or interactive video, and presenting identification of all identified parties participating in the event.

By way of the Voice-ID network system of FIG. 1, the convergence of social media interactivity and the ability of speaker identification/verification systems offers a unique capability to deliver talker specific information to the listener in many situations. This information can be delivered via visual display, on a cell phone, computer notebook or pad, or computer, or via audio link with particularly informative speech phrases or other identifiers. (In fact, information might be delivered with tactile displays such as back-mounted or hand mounted transformational displays). The information can be of two types: 1) For any person involved in the discussion, one might ask to receive the name, location, phone number, and any other available personal information about that person during the discussion. The parameters of the presentation, including frequency of display and information requested, would be part of a profile of the listener associated with either his persona or the device(s) which he is listening/watching or both, and 2) for any person involved in the discussion, if his or her personal information is not available, one might display an indicator that indicates that he or she is speaking "again", that is, that he or she has been heard before, and that this person can be identified as to when they spoke, what they said, where they spoke, or other helpful information about this person's interchange.

Figure 3:
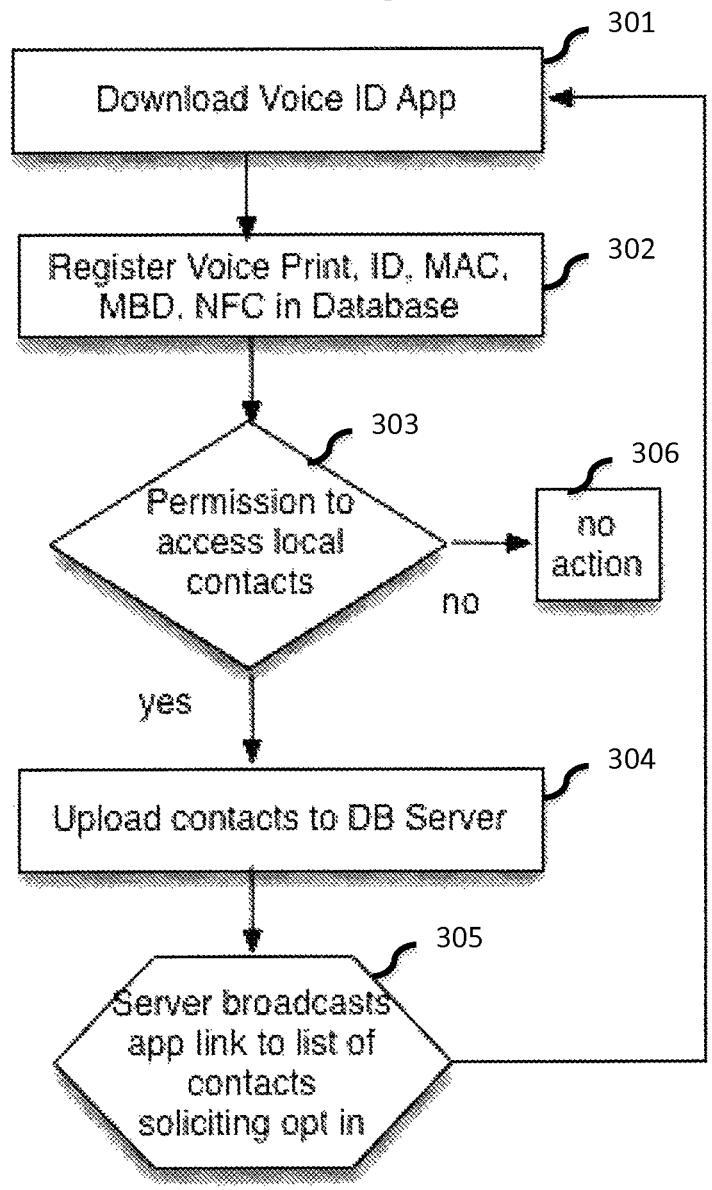
FIG. 3 depicts a method of Voice-ID Database entry acquisition in accordance with an exemplary embodiment.

FIG. 3 illustrates an embodiment of a specific method 300 for acquiring entries for the Voice-ID Database; namely, an acquisition method of database voice ID entries (also voice prints) is based on the exploitation of contact and friend lists collected from social networking sites. The method can start in a state where a user desires to opt into the voice ID application, and is on a mobile device running the voice ID app 103. Once a user has downloaded the VOICE-ID application (301) he or she may be requested to register with the VOICE-ID database and provide a voice sample along with other profile data such as but not limited to a password, caller ID, and/or other social data. (302) Subsequently the user may be asked to allow access to their social networking data (303) including their contact/friends lists. If access is not granted, then no action is taken at 306. If access is granted (which is expected to be a typical response), the VOICE-ID application may upload (304) the contact information to a database server, which in turn may send out social media advertisement messages to the acquired contacts (305) with the VOICE-ID application and its Earcon attached, soliciting their opt-in into the VOICE-ID network. This cycle of contact acquisition and advertisement campaign may repeat itself until a natural saturation of the population is reached. By then it is expected that the VOICE-ID database may have acquired a large number of entries of VOICE-ID network participants. In addition to exploiting social media contact lists, database entries could be provided through other sources such as but not limited to law enforcement agencies, educational institutes, or gaming applications and associated networks.

The opt-in method, i.e. the acquisition method of database entities is based on the exploitation of contact and friend lists that are often used in social networking sites. Once a user has downloaded the VOICE-ID application 103, he or she may be requested to register with the VOICE-ID database and provide a voice sample along with other profile data such as but not limited to a password, caller ID, and/or social data. Subsequently the user may be asked to allow access to their social networking data including their contact/friends lists. If access is granted (which is expected to be a typical response) the VOICE-ID application may upload the contact information to a database and server, which in turn may send out social media advertisement messages to the acquired contacts with the VOICE-ID application attached (an Earcon may alert the user), soliciting their opt-in into the VOICE-ID network. This cycle of contact acquisition and advertisement campaign may repeat itself until a natural saturation of the population is reached. By then it is expected that the VOICE-ID database may have acquired a large number of entries of VOICE-ID network participants.

In some embodiments, the VOICE-ID database is encrypted and access is secured via state of the art access methods. In addition to the voice ID, the profile data for an individual may contain a password, the MAC address of the device used for the voice recording along with its Near field communication (NFC) data, Wi-Fi, IP address, device unique address, physical hardwired location, GPS, Caller ID, Fingerprint, Face Print, as well as any form of multi-modal biometric identification (MBI) data. In addition to the VOICE-ID application, potential users of this verification database may include but not necessarily limited to the Education System, Banks, Credit Card Organizations, Government, Internet online retail sites, enterprise customer service, call centers, and the like.

The VOICE-ID application 103 typically may reside on a smart communication device such as IPHONE, ANDROID, Microsoft Windows, IOS, or RIM based devices, desktop computers, GPS devices, or embedded along with on-board computers in automobiles. It can react to voice signals in its proximity and obtain and present the associated user's profile data on the device such as but not limited to the users name, family data, profession, last contact, interests, hobbies, business ownership, and similar or any other test, graphic, metadata, video, audio or other data. Being in a conference room, a meeting, a tradeshow, a reception or party, the VOICE-ID application may pick up on the surrounding voices, or ambient sounds containing spoken utterances, and provide information about social contacts in near-real-time. Individuals whose voices are captured in near proximity to a device (having a microphone) who are registered subscribers to the VOICE-ID application that have an existing voice print or profile on the Voice ID database will obviously provide a quick result in being identified. Individuals whose voices are capture in near proximity to the device who are unregistered may or may not be recognized. If it is a new voice that is captured, a temporary identifier can be given and some limited form of tracking can be done with the new voice and the associated talker. In a classroom and lecturing hall, the teacher can obtain a wealth of information for the students with whom he or she has a conversation, right at his or her fingertips. In some embodiments or scenarios, entering a voice print can be a prerequisite for participating in a class, thereby populating a VOICE-ID database.

Use case examples for the use of the Voice-ID Network may include but are not limited to: teachers of the education system who want near-real-time profile data for the students they have a verbal exchange with; sales representatives in trade shows who want up-to-date information for potential customers; speakers in trade shows when asked questions from the audience; at social gatherings and parties to obtain identity and profile information about conversation partners; at business meetings to obtain identity and detailed profile information about conversation partners; ID verification of telephone customers for financial institutions; ID verification for cars to validate access to the vehicle and to control user specific functions of the vehicle; ID verification for building technology to validate access to buildings and to control user specific functions in the building; ID verification in online voice and video communications; or ID verification for Police and Military The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, the methods and systems disclosed herein can be extended to build a database (VOICE-ID-database) that contains secured and encrypted voice ID and other profile data for opted-in individuals, an acquisition method for such voice IDs and other profile data for individuals through the use of social networking capabilities, an ID verification system that is used both in social networking as well as in commercial transactions to deliver the ID of humans based on their voice samples, and a mobile application (VOICE-ID app) to facilitate the recording and translation of voice samples into voice ID data and profile data for the individual recorded, and which provides a visual representation of the data obtained. In contrast to existing social media capabilities the embodiments herein provide for the ability to obtain near-real-time information about people who are in close (voice distance) proximity of a communication device that has loaded the aforementioned voice ID application. The combination of the above referenced methods and systems are referred in the following as the VOICE-ID Network. Further note that the VOICE-ID application can obtain such real-time information from not only a single talker in close proximity to a device (having a microphone), but from multiple talkers or voices that are being heard directly or indirectly by the device. The voice or voices captured for comparison with an existing voice print or existing voice prints on the VOICE-ID database can be part of a directed conversation or can also be part of a voice being heard in an ambient space in relative close proximity to the device (that is not necessarily in a directed conversation with the user of the device).

In some embodiments, a method for voice identification and validation can include the steps of registering one or more users on a social media platform with login information during a social media session, acquiring a voice sample at any time of the social media session or a continuation of the social media session, associating the login information and the voice sample in a profile for each of the one or more users, and storing the profile as a voice print in a voice print identifier database. The method can further include the step of identifying at least one talker from an interfacing of the social media platform with the voice print identifier database.

In some embodiments, the step of identifying the at least one talker includes capturing, with a device equipped with a microphone and communicatively coupled to the social media platform, a voice sample of the at least one talker in vicinity of, or using, the device, accessing a social media associated with the login information of the profile for the one or more users, searching the social media for established connections to the voice print identifier database, and comparing the voice sample of the at least one taker with the voice prints of the profiles with the established connections in the voice print identifier database to determine a match to an identified talker. The method can further provide a portion of the profile of the identified talker if the match is determined. In some embodiments, the searching includes corroborating the profile with the social media to validate an identity of the at least one talker. In some embodiments, the method can further include capturing device specific information of at least one device used during the social media session to capture the voice sample of the at least one talker and associating the login information, the voice print and the device specific information in the profile for each of the one or more users. In some embodiments, the searching includes corroborating the profile which includes the device specific information with the social media to validate the at least one talker that is identified. In some embodiments, the method further includes retrieving the profiles corresponding to the device from the device specific information, or corresponding to a user of the device from the login information, to narrow a searching extent of the voice print stored in the voice identifier database when accessing the social media. In some embodiments, the device specific information is one among a global positioning system (GPS) location, a wi-fi network, a MAC address, an IP address, and a unique device identifier.

In some embodiments, the social media is one among a friend list, a contact list, an email account, a text message history, a call history, an internet search history, a conference event, or a community organization. In some embodiments, the profile includes one among a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record.

In some embodiments, the method further comprises capturing multiple voices from multiple talkers within vicinity of the device or over a social network and presenting an indication of the identity of some or all of the multiple talkers, including but not limited to, a name, background or contact information of the talkers. In some embodiments, the method is extended to events such as multi-call, multi-conference, video call, group call, multiple person events, speaking engagements or interactive video, and further presenting identification of all identified parties participating in the event.

In some embodiments, the method can include modifying an access control to the device responsive to detecting and verifying a talker, including but not limited to, automatically changing and entering log in credentials, account information, device controls, or personal preferences. In some other embodiments, the method can further include accessing a contact or friend list associated with the talker and narrowing down a searching extent for confirming an identity of the talker from the contact or friend list.

In yet some other embodiments, a system for voice identification and validation can include a voice print identifier database that contains one or more voice prints of opted-in network subscribers, a database server communicatively coupled to the voice print identifier database that controls opt-in procedures for entering, uploading and updating the voice prints, and a social media application communicatively coupled to the voice print identifier database server. The social media application can register one or more users on a social media platform with login information during a social media session, acquire a voice sample at any time of the social media session or a continuation of the social media session, associate the login information and the voice sample in a profile for each of the one or more users, and store the profile as a voice print in the voice print identifier database, where the social media application identifies at least one talker from an interfacing of the social media platform with the voice print identifier database. In some embodiments, the profile includes one among a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record.

In some embodiments, the social media application captures, with a device equipped with a microphone and communicatively coupled to the social media platform, a voice sample of the at least one talker in vicinity of, or using, the device, accesses a social media associated with the login information of the profile for the one or more users, searches the social media for established connections to the voice print identifier database, compares the voice sample of the at least one taker with the voice prints of the profiles with the established connections in the connections to determine a match to an identified talker, and provides a portion of the profile of the identified talker if the match is determined. In some embodiments, the social media is one among a friend list, a contact list, an email account, a text message history, a call history, an internet search history, a conference event, a community organization.

In some embodiments the social media application captures device specific information of at least one device used during the social media session, associates the login information, the voice print and the device specific information in the profile for each of the one or more user, and corroborates the profile, which includes the device specific information, with the social media to validate the identified talker.

In some embodiments, the social media application retrieves the profile corresponding to the device from the device specific information, or corresponding to a user of the device from the login information, to narrow a searching extent of the voice print stored in the voice identifier database when accessing the social media. In some embodiments, the device specific information is one among a global positioning system (GPS) location, a wi-fi network, a MAC address, an IP address, and a unique device identifier.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for voice identification and validation comprising:
   registering one or more users on a social media platform with login information during a social media session;
   acquiring a voice sample at any time of the social media session or a continuation of the social media session;
   associating the login information and the voice sample in a profile for each of the one or more users;
   storing the profile as a voice print in a voice print identifier database;
   enabling an opt-in indication from a social media user of the one of more users, wherein the opt-in indication authorizes third party social media users to use the media platform to identify the social media user by detecting the social media user's voice;
   identifying a talker based on an interfacing of the social media platform with the voice print identifier database during the interfacing by the talker on the social media platform and based on the talker being in a vicinity of a device utilized to acquire the voice sample and to conduct the social media session, wherein the talker is a social media user that opted-in and is not a user of the device; and
   delivering the identity of the talker to the user of the device.

2. The method of claim 1, identifying the talker comprises:
   capturing, with the device equipped with a microphone and communicatively coupled to the social media platform, the voice sample of the talker in the vicinity of the device;
   accessing a social media associated with the login information of the profile for the one or more users;
   searching the social media for established connections to the voice print identifier database;
   comparing the voice sample of the talker with the voice prints of the profiles with the established connections in the voice print identifier database to determine a match to an identified talker; and
   providing a portion of the profile of the identified talker if the match is determined.

3. The method of claim 2, where the searching includes corroborating the profile with the social media to validate an identity of the talker.

4. The method of claim 2, further comprising:
   capturing device specific information of the device used during the social media session to capture the voice sample of the talker; and associating the login information, the voice print and the device specific information in the profile for each of the one or more users.

5. The method of claim 4, where the searching includes corroborating the profile which includes the device specific information with the social media to validate the talker that is identified.

6. The method of claim 4, further comprising:
retrieving the profiles corresponding to the device from the device specific information, or corresponding to the user of the device from the login information, wherein the profiles are utilized to narrow a searching extent of the voice print stored in the voice identifier database when accessing the social media.

7. The method of claim 4, where the device specific information comprises a global positioning system (GPS) location, a wi-fi network, a MAC address, an IP address, a unique device identifier, or a combination thereof.

8. The method of claim 2, where the social media comprises a friend list, a contact list, an email account, a text message history, a call history, an internet search history, a conference event, a community organization, or a combination thereof.

9. The method of claim 1, where the profile includes a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, criminal record, or a combination thereof.

10. The method of claim 2, further comprising:
capturing multiple voices from multiple talkers within the vicinity of the device or over a social network; and
presenting an indication of the identity of some or all of the multiple talkers, including, but not limited to, a name, background or contact information of the talkers.

11. The method of claim 10, further comprising identifying the talker based on an event comprising multi-call, multi-conference, video call, group call, multiple person events, speaking engagements or interactive video, and
presenting identification of all identified parties participating in the event.

12. The method of claim 2, further comprising modifying an access control to the device in response to detecting and verifying the talker, including but not limited to, automatically changing and entering log in credentials, account information, device controls, or personal preferences.

13. The method of claim 2, further comprising:
accessing a contact or friend list associated with the talker; and
narrowing down a searching extent for confirming an identity of the talker from the contact or the friend list.

14. A system for voice identification and validation comprising:
a voice print identifier database that contains one or more voice prints of opted-in network subscribers;
a database server communicatively coupled to the voice print identifier database that controls opt-in procedures for entering, uploading and updating the voice prints; and
a social media application communicatively coupled to the voice print identifier database server that:
registers one or more users on a social media platform with login information during a social media session;
acquires a voice sample at any time of the social media session or a continuation of the social media session;
associates the login information and the voice sample in a profile for each of the one or more users;
enables an opt-in indication from a social media user of the one of more users, wherein the opt-in indication authorizes third party social media users to use the media platform to identify the social media user by detecting the social media user's voice; and
stores the profile as a voice print in the voice print identifier database, wherein the social media application identifies a talker based on an interfacing of the social media platform with the voice print identifier database while the talker is interfacing on the social media platform and based on the talker being in a vicinity of a device utilized to acquire the voice sample and to conduct the social media session, wherein the talker is a social media user that opted-in and is not a user of the device; and
delivers the identity of the talker to the user of the device.

15. The system of claim 14, where the social media application:
captures, with the device equipped with a microphone and communicatively coupled to the social media platform, the voice sample of the talker in the vicinity of the device;
accesses a social media associated with the login information of the profile for the one or more users;
searches the social media for established connections to the voice print identifier database;
compares the voice sample of the talker with the voice prints of the profiles with the established connections in the connections to determine a match to an identified talker; and
provides a portion of the profile of the identified talker if the match is determined.

16. The system of claim 14, where the social media application:
captures device specific information of at least one device used during the social media session;
associates the login information, the voice print and the device specific information in the profile for each of the one or more users; and
corroborates the profile, which includes the device specific information, with the social media to validate the identified talker.

17. The system of claim 14, where the social media application retrieves the profile corresponding to the device from the device specific information, or corresponding to the user of the device from the login information, wherein the profile is utilized to narrow a searching extent of the voice print stored in the voice identifier database when accessing the social media.

18. The system of claim 17, where the device specific information comprises a global positioning system (GPS) location, a wi-fi network, a MAC address, an IP address, a unique device identifier, or a combination thereof.

19. The system of claim 15, wherein the social media comprises a friend list, a contact list, an email account, a text message history, a call history, an internet search history, a conference event, a community organization, or a combination thereof.

20. The system of claim 14, where the profile includes a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record, or a combination thereof.

* * * * *